April 13, 1926.  1,580,472
S. O. DUEMLER
AXLE
Original Filed Sept. 22, 1923
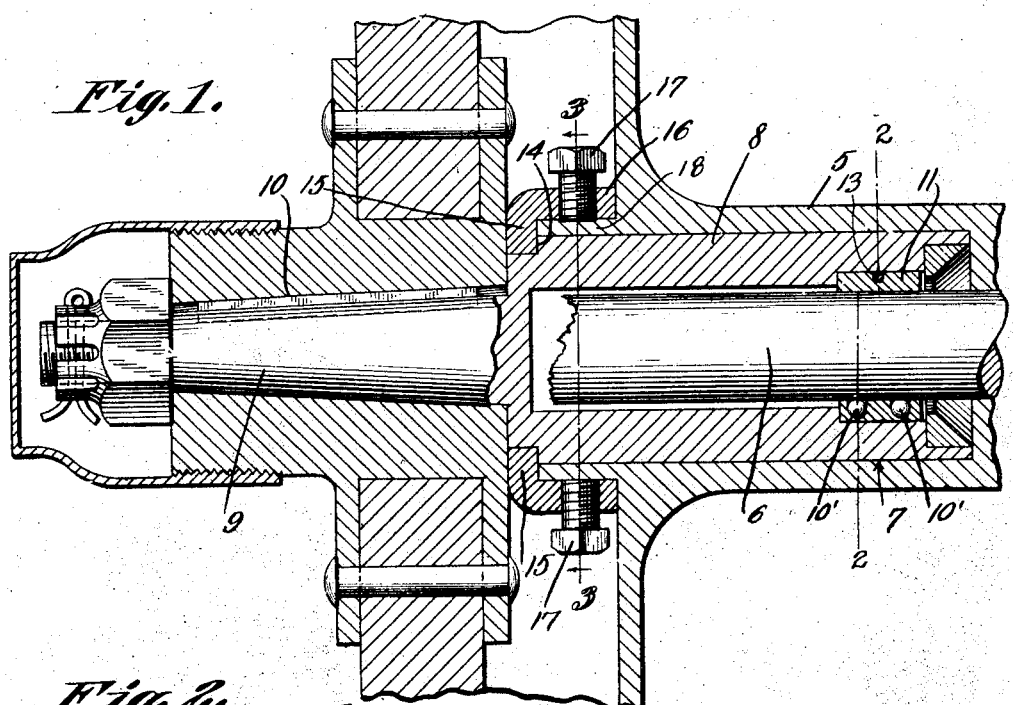
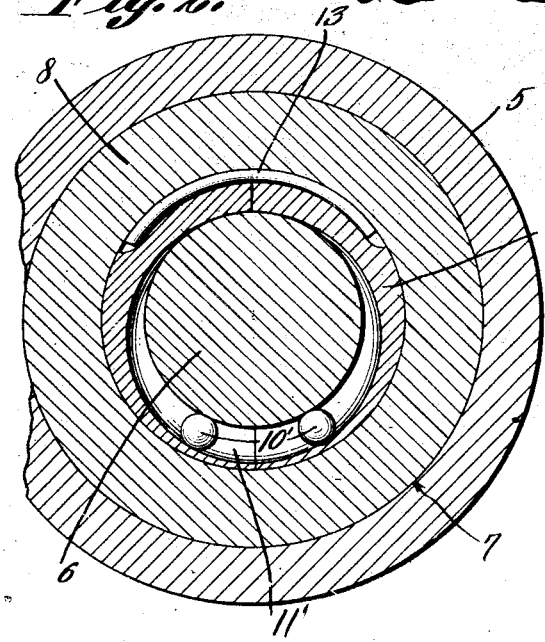
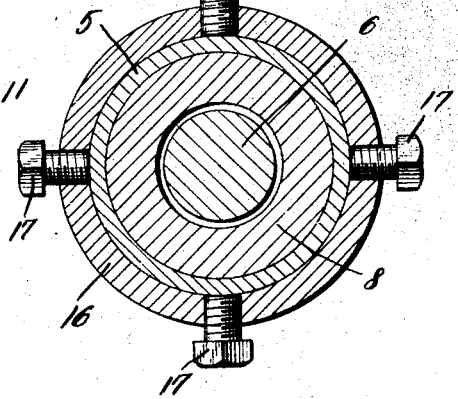
Inventor,
S. O. Duemler
By C. A. Snow & Co.
Attorney Patented Apr. 13, 1926.

1,580,472

UNITED STATES PATENT OFFICE.

SAMUEL O. DUEMLER, OF PHOENIX, ARIZONA.

AXLE.

Application filed September 22, 1923, Serial No. 664,274. Renewed February 23, 1926.

*To all whom it may concern:*

Be it known that I, SAMUEL O. DUEMLER, a citizen of the United States, residing at Phoenix, in the county of Maricopa and State of Arizona, have invented a new and useful Axle, of which the following is a specification.

This invention relates to an emergency axle, which may be readily and easily applied to a broken axle, providing means whereby the wheel may be supported in a manner to enable the vehicle to be propelled by its own power.

An important object of the invention is the provision of means for automatically locking the emergency axle to the broken portion of the axle to insure against the emergency axle becoming disconnected while in use.

A still further object of the invention is to provide means to prevent lateral movement of the emergency axle with respect to the axle to which the same is secured.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a fragmental sectional view through the emergency axle disclosing the manner of connecting the same to a broken axle.

Figure 2 is an enlarged transverse sectional view through the emergency axle and axle supporting the same, taken on line 2—2 of Figure 1.

Figure 3 is a sectional view taken approximately on line 3—3 of Figure 1.

Referring to the drawing in detail, the reference character 5 designates the usual axle housing in which operates the axle 6.

The axle 6 is illustrated as broken and supplied with an emergency axle constructed in accordance with the invention, the emergency axle being indicated generally by the reference character 7 and includes a tubular section 8 adapted to fit over the axle which has been broken. Formed integral with the tubular section 8 is a stub axle 9 formed with a groove to receive the key 10 adapted to secure the wheel to the stub axle so that rotary movement of the stub axle will be imparted to the wheel.

As shown, the tubular member 8 is cut away to receive the sleeve 11 that is sectional in formation and provided with grooves 11' having inclined walls to cause the balls 10 supported therein to set up a wedging action between the securing ring and axle 6 to secure the axle 6 within the tubular portion 8 of the emergency axle.

In order that the sections of the securing ring will be normally held together, a spring member 13 is provided and fitted in communicating grooves of the sleeve sections to exert a pressure on the sections thereof. Shoulders 14 are provided on the emergency axle at a point intermediate the ends thereof, which shoulders are engaged by the flange 15 of the ring 16, which ring is provided with threaded openings to receive the screws 17 that secure the ring 16 to the flange 18 of the usual axle housing.

From the foregoing it will be obvious that movement of the emergency axle longitudinally of the axle 6 is restricted by the contact of the flange 15 with the shoulders 14.

In the use of the device, the emergency axle is fitted over the broken axle and the securing ring positioned so that the rotary movement of the axle will set up a wedging action as described to connect the main or broken axle to the emergency axle to rotate therewith.

I claim:—

1. An emergency axle including a tubular section and a stub axle section, said tubular section adapted to be fitted over an axle to support the emergency axle, a securing sleeve within the tubular section and having balls so disposed as to engage the axle supporting the tubular section, said balls adapted to set up a binding action to secure the tubular section to an axle, and means for restricting movement of the tubular section longitudinally of the axle supporting the same.

2. An emergency axle including a tubular section and a stub axle section, said tubular section having a cut out portion, a securing sleeve positioned in the cut out portion, said tubular section adapted to be fitted over an axle, means carried by the securing sleeve and engaging the axle supporting the emergency axle to secure the emergency axle to the axle supporting the emergency axle, and means for restricting movement of the emergency axle longitudinally of the axle supporting the same.

In testimony that I claim the foregoing as my own, I have hereto affixed my signature.

SAMUEL O. DUEMLER.